United States Patent
Hagiwara et al.

(10) Patent No.: US 6,878,766 B2
(45) Date of Patent: Apr. 12, 2005

(54) COMPOSITION FOR DIP FORMING, DIP-FORMED OBJECT, AND PROCESS FOR PRODUCING THE SAME

(75) Inventors: Katsuo Hagiwara, Kawasaki (JP); Hisanori Ota, Kawasaki (JP); Jun Sotoyama, Kawasaki (JP); Toshihiro Sakakibara, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/181,426

(22) PCT Filed: Jan. 24, 2001

(86) PCT No.: PCT/JP01/00425

§ 371 (c)(1),
(2), (4) Date: Jul. 24, 2002

(87) PCT Pub. No.: WO01/53388

PCT Pub. Date: Jul. 26, 2001

(65) Prior Publication Data

US 2003/0050377 A1 Mar. 13, 2003

(30) Foreign Application Priority Data

Jan. 24, 2000 (JP) .................................... 2000-013709

(51) Int. Cl.[7] ................................................. C08L 3/18
(52) U.S. Cl. .................... 524/430; 524/432; 524/478; 524/560; 524/562; 525/478; 2/168; 128/844
(58) Field of Search ................................ 524/432, 430, 524/478, 560, 562, 418; 525/478; 2/168; 128/844; 526/340

(56) References Cited

U.S. PATENT DOCUMENTS

| 5,014,362 A | | 5/1991 | Tillotson et al. .............. 2/168 |
| 5,910,533 A | | 6/1999 | Ghosal et al. ............. 524/560 |
| 6,566,435 B1 | * | 5/2003 | Teoh et al. ................. 524/432 |

FOREIGN PATENT DOCUMENTS

| EP | 0 486 183 | | 5/1992 |
| EP | 0 915 133 | | 5/1999 |
| EP | 0 915 133 A1 | * | 5/1999 |
| JP | 7-316211 | | 12/1995 |
| WO | 97/48765 | | 12/1997 |

\* cited by examiner

*Primary Examiner*—Robert D. Harlan
(74) *Attorney, Agent, or Firm*—Armstrong, Kratz, Quintos, Hanson & Brooks, LLP

(57) ABSTRACT

A dip-formed article which is shaped from a dip-formable composition comprising 100 weight parts of a conjugated diene copolymer prepared by copolymerization of 50 to 85 weight % of a conjugated diene monomer with 15 to 40 weight % of an ethylenically unsaturated nitrile monomer, 1 to 4 weight % of an ethylenically unsaturated acid monomer and 0 to 30 weight % of a copolymerizable other ethylenically unsaturated monomer, 2 to 6 weight parts of sulfur and 0 to 0.2 weight parts of zinc oxide. The dip-formed article is characterized as a glove by being well elongated and ease in donning, being not easily broken upon donning, and not wearying a wearer's hand even when it is worn for a long time, and having improved lastingness of the tight conformity to the skin of a wearer's hand.

19 Claims, No Drawings

US 6,878,766 B2

COMPOSITION FOR DIP FORMING, DIP-FORMED OBJECT, AND PROCESS FOR PRODUCING THE SAME

TECHNICAL FIELD

This invention relates to a dip-formable composition, a dip-formed article and a method for making the dip-formed article. More particularly, it relates to a dip-formed article such as a glove which is well stretched, can be easily donned, is not easily broken, and, even when it is worn for a long time, it does not weary a wearer's hand and its tight conformity to the skin of a wearer's hand lasts for a long time; a method for making the dip-formed article; and a dip-formable composition capable of giving the dip-formed article.

BACKGROUND ART

Rubber articles such as a glove, a finger cot and a dropper are produced by a method generally called "dip-forming". Of these rubber articles, gloves are widely used in a household field and an industrial field. For these uses, it is required that the rubber articles are not broken even when they are used for a long period of time, and they have high resistance to solvents.

In recent years, the use of a glove is extended to a medical field including a surgical operation, and an electronic part-production field. In these uses, a glove of a relatively small size is worn in an expanded state to enhance its tight conformity to the skin of a wearer's hand. Therefore, the following characteristics are required for a glove: (i) ease in donning, i.e., capability of being well stretched and easily donned, (ii) good followability, i.e., capability of being easily stretched and shrunk so as to follow the movement of wearer's fingers so that, even when it is worn for a long time, it does not weary a wearer's hand, (iii) good and lasting tight conformity, namely, when it is distorted by the movement of wearer's fingers, it is loosened or creased with wrinkles only to a slight extent, and tight conformity to the skin of a wearer's hand lasts for a long time.

If a glove for surgical operation has pinholes or is broken during operation, infections tend to be caused by bacteria or virus. If a glove for electronic part-production has pinholes or is broken during operation, insulation failure is liable to occur due to electrolytes contained in sweat and grease from the human body with the result of malfunction of electronic parts. Therefore, it is required that a glove has no pin holes and is not easily broken during operation.

Natural rubber latex has heretofore been used for gloves for the above-mentioned uses. However, gloves made from natural rubber latex have a problem such that wearers acquire allergy thereto. An attempt is made for the removal of allergic substances, but the steps required are complicated and the production cost is increased.

As a substitute for natural rubber latex, a soft glove having high tensile strength and chemical resistance, which is comprised of a nitrile rubber composition containing no zinc oxide, has been proposed in international publication WO 97/48,765. However, examination of the nitrile rubber glove by the present inventors has revealed that the followability and lastingness of the tight conformity to the skin of a wearer's hand are insufficient.

A glove having characteristics such that modulus in tension at 100% elongation becomes substantially zero in 6 minutes from the start of elongation, which is comprised of a nitrile-butadiene rubber and a minor amount of zinc oxide, has been proposed in U.S. Pat. No. 5,014,362. However, this glove has poor lastingness of tight conformity.

DISCLOSURE OF THE INVENTION

In view of the foregoing, a primary object of the present invention is to provide a dip-formed article such as a glove which is not easily broken and can be easily donned, and has enhanced lastingness of tight conformity to the skin of a wearer's hand; a method for making the dip-formed article; and a dip-formable composition giving the dip-formed article.

To attain the above-mentioned object, the present inventors conducted researches and have found that, when a conjugated diene copolymer prepared by copolymerization of a conjugated diene monomer with an ethylenically unsaturated nitrile monomer and an ethylenically unsaturated acid monomer is vulcanized with a relatively large amount of sulfur, the resulting vulcanizate exhibits remarkable characteristics which have not been seen in the hitherto proposed rubber vulcanizates. Based on this finding, the present invention has been completed.

Thus, in one aspect of the present invention, there is provided a dip-formed article which is shaped from a dip-formable composition comprising a conjugated diene copolymer prepared by copolymerization of a conjugated diene monomer with an ethylenically unsaturated nitrile monomer and an ethylenically unsaturated acid monomer, and sulfur; and which has a modulus in tension at 300% elongation of not larger than 3 MPa, a tensile strength at break of at least 10 MPa, an elongation at break of at least 500% and a modulus retention of at least 50%.

In another aspect of the present invention, there is provided a dip-formable composition comprising 100 parts by weight of a conjugated diene copolymer comprising 50% to 85% by weight of conjugated diene monomer units, 15% to 40% by weight of ethylenically unsaturated nitrile monomer units, 1% to 4% by weight of ethylenically unsaturated acid monomer units and 0% to 30% by weight of copolymerizable other ethylenically unsaturated monomer units, 2 to 6 parts by weight of sulfur and 0 to 0.2 part by weight of zinc oxide.

In still another aspect of the present invention, there is provided a method for making a dip-formed article comprising dip-forming the above-mentioned dip-formable composition.

BEST MODE FOR CARRYING OUT THE INVENTION

The invention will now be described in detail.

The conjugated diene copolymer used for the dip-formed article of the present invention comprises conjugated diene monomer units, ethylenically unsaturated nitrile monomer units, ethylenically unsaturated acid monomer units, and optional units derived from other ethylenically unsaturated monomers copolymerizable with these monomers.

The conjugated diene monomer is not particularly limited, and as specific examples thereof, there can be mentioned 1,3-butadiene, isoprene, 2,3-dimethyl-1,3-butadiene, 2-ethyl-1,3-butadiene, 1,3-pentadiene and chloroprene. Of these, 1,3-butadiene is preferable. These conjugated diene monomers may be used either alone or as a combination of at least two thereof. The amount of the conjugated diene monomer units is preferably in the range of 50% to 85% by weight, more preferably 60% to 81% by weight and especially preferably 65% to 76% by weight, based on the weight of the total monomer units. If the amount of conjugated monomer units is too small, a glove has poor conformity to the skin of a wearer's hand. In contrast, if the amount of conjugated diene monomer units is too large, a glove tends to be easily broken upon donning.

No limitation is imposed to the ethylenically unsaturated nitrile monomer, and as specific examples thereof, there can be mentioned acrylonitrile, methacrylonitrile, fumaronitrile and α-chloroacrylonitrile. These ethylenically unsaturated nitrile monomers may be used either alone or as a combination of at least two thereof. The amount of the ethylenically unsaturated nitrile monomer units is preferably in the range of 15% to 40% by weight, more preferably 17% to 35% by weight and especially preferably 22% to 32% by weight, based on the weight of the total monomer units. If the amount of ethylenically unsaturated nitrite monomer units is too small, a glove tends to be easily broken upon donning and its tight conformity to the skin of a wearer's hand does not last for a long period. In contrast, if the amount of ethylenically unsaturated nitrile monomer units is too larger, a glove has poor conformity to the skin of a wearer's hand.

No limitation is imposed to the ethylenically unsaturated acid monomer provided that the monomer has an acid group such as, for example, a carboxyl group, a sulfonic acid group or an acid anhydride group. As specific examples of the ethylenically unsaturated acid monomer, there can be mentioned ethylenically unsaturated carboxylic acid monomers such as acrylic acid, methacrylic acid, itaconic acid, maleic acid and tumaric acid; polycarboxylic anhydride monomers such as maleic anhydride and citraconic anhydride; ethylenically unsaturated sulfonic acid monomers such as styrenesulfonic acid; and ethylenically unsaturated polycarboxylic acid partial ester monomers such as monobutyl fumarate, monobutyl maleate and 2-hydroxypropyl maleate. These ethylenically unsaturated acid monomers may be used in the form of an alkali metal salt or an ammonium salt. Of these, ethylenically unsaturated carboxylic acid monomers are preferable. Methacrylic acid is especially preferable. These ethylenically unsaturated acid monomers may be used either alone or as a combination of at least two thereof. The amount of the ethylenically unsaturated acid monomer units is preferably in the range of 1% to 4% by weight, more preferably 2% to 3.5% by weight and especially preferably 2% to 3% by weight, based on the weight of the total monomer units. If the amount of ethylenically unsaturated acid monomer units is too small, a glove tends to be easily broken upon donning. In contrast, if the amount of ethylenically unsaturated acid monomer units is too large, a glove has poor conformity to the skin of a wearer's hand and its tight conformity to the skin of a wearer's hand does not last for a long period.

Other copolymerizable ethylenically unsaturated monomers optionally used for copolymerization include, for example, aromatic vinyl monomers such as styrene and alkylstyrenes; ethylenically unsaturated amide monomers such as acrylamide, methacrylamide, N-methylolacrylamide and N-methylolmethacrylamide; ethylenically unsaturated carboxylic acid ester monomers such as methyl acrylate, methyl methacrylate, ethyl acrylate, ethyl methacrylate, butyl acrylate, butyl methacrylate, 2-ethylhexyl acrylate and 2-ethylhexyl methacrylate; and crosslinking monomers such as divinylbenzene, diethylene glycol diacrylate, diethylane glycol dimethacrylate, pentaerythritol acrylate and pentaerythritol mathacrylate. The amount of the copolymerizable other ethylenically unsaturated monomer units is preferably in the range of 0% to 30% by weight, more preferably 0% to 21% by weight and especially preferably 0% to 11% by weight, based on the weight of the total monomer units.

As a preferable example of the conjugated diene copolymer used in the present invention, there can be mentioned conjugated diene-ethylenically unsaturated nitrile-ethylenically unsaturated acid copolymers. Of these, a butadiene-acrylonitrile-methacrylic acid copolymer is especially preferable. This copolymer comprises, based on the weight of copolymer, preferably 50% to 85% by weight, more preferably 61.5% to 81% by weight and especially preferably 65% to 76% by weight of butadiene units, preferably 15% to 40% by weight, more preferably 17% to 35% by weight and especially preferably 22% to 32% by weight of acrylonitrile units, and 1% to 4% by weight, more preferably 2% to 3.5% by weight and especially preferably 2% to 3% by weight of methacrylic acid units.

The conjugated diene copolymer preferably contains not larger than 50% by weight, more preferably not larger than 25% by weight and especially preferably not larger than 10% by weight of ingredients insoluble in methyl ethyl ketone. When the content of methyl ethyl ketone-insoluble ingredients in the copolymer is within this specified range, a rubber glove having well-balanced characteristics can be obtained.

The fractions of the conjugated diene copolymer, which are soluble in tetrahydrofuran, preferably have a weight average molecular weight in the range of 50,000 to 500,000, more preferably 80,000 to 200,000 as expressed in terms of that of polystyrene (said weight average molecular weight is hereinafter referred to merely as "molecular weight"). When the molecular weight of copolymer is within this specified range, a rubber glove having well-balanced characteristics can be obtained.

The procedure by which the conjugated diene copolymer is produced is not particularly limited, and, for example, an emulsion polymerization procedure and a solution polymerization procedure can be adopted. Among these an emulsion polymerization procedure is preferred because an as-obtained copolymer latex can be used without a special treatment as a main ingredient of the dip-formable composition.

As specific examples of emulsifiers used for emulsion polymerization, there can be mentioned nonionic emulsifiers such as polyoxyethylene alkyl ethers, polyoxyethylene alkylphanol ethers, polyoxyethylene alkyl asters and polyoxyethylene sorbitan alkyl asters; anionic emulsifiers such as fatty acid salts, for example, salts of myristic acid, palmitic acid, oleic acid and linolenic acid, alkylbenzenesulfonic acid salts such as sodium dodecylbenzenesulfonate, higher alcohol sulfuric acid ester salts, and alkylsulfosuccinic acid salts; cationic emulsifiers such as alkyltrimethylammonium chlorides, dialkylammonium chlorides and benzylammonium chloride; and copolymerizable emulsifiers such as sulfoesters of α, β-unsaturated carboxylic acids, sulfate esters of α, β-unsaturated carboxylic acids and sulfoalkyl aryl ethers. Of these, anionic emulsifiers are preferably used. These emulsifiers may be used either alone or as a combination of at least two thereof. The amount of emulsifiers is in the range of about 1 to 10 parts by weight, more preferably 2 to 6 parts by weight, based on 100 parts by weight of the monomer mixtures.

As specific examples of polymerization initiators, there can be mentioned inorganic peroxides such as sodium persulfate, potassium persulfate, ammonium persuldate and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide and benzoyl peroxide; and azo compounds such as azobisisobutyronitrile, azobis-2,4-dimethylvaleronitrile and methyl azobisisobutyrate. Of these, inorganic peroxides are preferable because a copolymer latex can be stably produced. These polymerization initiators may be used either alone or as a mixture of at least two thereof. The amount of polymerization initiators varies depending upon the particular kind thereof but is in the range of about 0.1 to 1 part by weight based on 100 parts by weight of the monomer mixture.

The peroxide can be used in combination with a reducing agent, namely, as a redox polymerization initiator. The reducing agent used includes, for example, compounds containing a metal ion of a reduced state such as ferrous sulfate cupreous naphthenate; sulfonic acid compounds such as methanesulfonic acid; and amine compounds such as dimethylaniline. These reducing agents may be used either alone or as a combination of at least two thereof. The amount of reducing agents varies depending upon the particular kind thereof but is in the range of 0.03 to 10 parts by weight based on 1 part by weight of a peroxide.

Among the above-recited polymerization initiators, a redox polymerization initiator comprising a combination of a peroxide polymerization initiator with a reducing agent is preferable.

In emulsion polymerization, a molecular weight modifier is preferably used to control the molecular weight of copolymer. As specific examples of the molecular weight modifier, there can be mentioned mercaptans such as n-butylmercaptan and t-dodecylmercaptan; sulfides such as tatraethylthiuram sulfide and dipentamethylenethiuram hexasulfide; and an α-methylstyrene dimer and carbon tetrachloride. Of these, mercaptans are preferable. t-dodecylmercaptan is especially preferable. These molecular weight modifiers may be used either alone or as a mixture of at least two thereof. The amount of molecular weight modifier may be chosen so that the molecular weight of copolymer falls within a desired range, but its amount is in the range of about 0.1 to 2 parts by weight, preferably 0.3 to 1 part by weight, based on 100 parts by weight of the monomer mixture.

The amount of water used for emulsion polymerization is in the range of about 80 to 600 parts by weight, preferably 100 to 200 parts by weight, based on 100 parts by weight of the monomer mixture.

If desired, polymerization auxiliaries such as a particle size controller, an age resister, a chelating agent and an oxygen catcher can be used.

The manner in which a monomer mixture is added is not particularly limited, and includes, for example, a manner in which a monomer mixture is charged in one lot in a polymerization vessel, a manner in which a monomer mixture is continuously fed into a polymerization vessel, and a manner in which a part of monomer mixture is initially charged in a polymerization vessel and the remainder is continuously added therein.

The composition of the monomer mixture is chosen in consideration of the polymerization conversion and other factors so that a copolymer having a desired composition is obtained.

In emulsion polymerization, the polymerization temperature is preferably in the range of 10 to 60° C., more preferably 30 to 45° C., and the polymerization time is in the range of about 5 to 30 hours. The polymerization conversion is preferably at least 90% by weight, more preferably at least 92% by weight.

The copolymer latex as obtained by emulsion polymerization has a particle diameter preferably in the range of 60 to 300 nm, more preferably 80 to 150 nm, as number average particle diameter as measured by a transmission electron microscope. The particle diameter can be desirably controlled by varying the kind of emulsifier or the amount of polymerization initiator or by other means.

After the emulsion polymerization proceeds until the polymerization conversion reaches a desired value, if desired, a polymerization stopper is added to terminate the reaction, and further, if desired, unreacted monomers are removed, and then, the solid concentration and pH value of the as-obtained copolymer latex are adjusted to predetermined values to give a desired copolymer latex.

The adjustment of pH value of a copolymer latex is conducted by addition of a basic substance. The basic substance used includes, for example, alkali metal hydroxides such as lithium hydroxide, sodium hydroxide and potassium hydroxide; alkali metal carbonates such as sodium carbonate and potassium carbonate; alkali metal hydrogencarbonates such as sodium hydrogencarbonate; ammonia; and organic amine compounds such as trimethylammonium and triethanolamine. Of these, alkali metal hydroxides and ammonia are preferably used. These basic substances are added as a solution having a concentration of 1% to 40% by weight, preferably 2% to 15% by weight, and preferably as an aqueous solution to avoid occurrence of agglomerates upon addition.

The dip-formable composition of the present invention comprises 100 parts by weight of the above-mentioned conjugated diene copolymer, sulfur and optional zinc oxide.

The amount of sulfur is preferably in the range of 2 to 6 parts by weight, more preferably 2 to 5 parts by weight, based on 100 parts by weight of the conjugated diene copolymer. If the amount of sulfur is too small, a glove tends to be broken upon donning and its tight conformity to the skin of a wearer's hand does not last for a long period. In contrast, if the amount of sulfur is too large, a glove has poor conformity to the skin of a wearer's hand.

Zinc oxide is preferably not used. However, when zinc oxide is used, its amount is preferably up to 0.2 part by weight, more preferably up to 0.1 part by weight, based on 100 parts by weight of the conjugated diene copolymer. If the amount of zinc oxide is too large, a glove has poor conformity to the skin of a wearer's hand.

The dip-formable composition of the present invention preferably further comprises a vulcanization accelerator. As specific examples of the vulcanization accelerator, there can be mentioned aldehyde-amine condensates such as n-butyl aldehyde-aniline condensate and butyl aldehyde-monobutylamine condensate; thiurams such as 2-mercaptobenzothiazole zinc, tetramethylthiuram monosulfide and tetramethylthiuram disulfide; and dithiocarbamates such as zinc diethyldithiocarbamate and zinc dibutyldithiocarbamate. Of these, thiurams and dithiocarbamates are preferable. These vulcanization accelerators are used preferably in combination. The amount of vulcanization accelerators is preferably in the range of 0.5 to 4 parts by weight, more preferably 1 to 3 parts by weight, based on 100 parts by weight of the conjugated diene copolymer. When the amount of vulcanization accelerators is within this range, a glove is not easily broken upon donning and is excellent in ease in donning.

If desired, the dip-formable composition of the present invention further comprises auxiliaries such as a pH adjuster, an age resister, a thickener and a filler. Provided that the object of the present invention can be achieved, other latexes such as natural rubber latex and isoprene rubber latex can be added in the composition.

The method for preparing the dip-formable composition is not particularly limited. For example, there is adopted a method wherein sulfur, a vulcanization accelerator, a filler, a thickener and other ingredients are incorporated in a conjugated diene copolymer latex by using a dispersion mixer such as a ball mill, a kneader or a disper. Alternatively, a method can be adopted wherein predetermined ingredients other than a conjugated diene copolymer are mixed together by using the above-mentioned dispersion mixer to prepare an aqueous dispersion of these ingredients, and then, the copolymer and other remainder ingredients are mixed together with the aqueous dispersion.

The as-prepared dip-formable composition can be subjected to aging. Aging conditions employed vary depending upon the particular composition, but usually aging is conducted at a temperature in the range of room temperature to about 40° C. for a period of several hours to several days.

The solid concentration in the dip-formable composition is preferably in the range of 5% to 50% by weight, more preferably 10% to 45% by weight and especially preferably 20% to 40% by weight. The pH value of the dip-formable composition is preferably in the range of 8 to 12 and more preferably 9 to 11. To adjust the pH value of the dip-formable composition, a basic substance can be added which is selected from those recited above for pH adjustment of a conjugated diene copolymer latex. Among the recited basic substances, alkali metal hydroxides are preferable. Potassium hydroxide is especially preferable.

The method for making the dip-formed article of the present invention is a method for dip-forming the above-mentioned dip-formable composition.

The dip-forming is carried out by a method wherein a form is dipped in a bath of the dip-formable composition whereby the dip-formable composition is deposited over the form, the form is then taken from the bath, and then the form is dried whereby the composition deposited thereon is dried.

In the dip-forming method, a coagulant can be applied to a form before the form is dipped in a bath of the dip-formable composition or after the form is taken from said bath. More specifically, a form can be dipped in a bath of coagulant whereby the coagulant is deposited on the form before the form is dipped in a bath of the dip-formable composition, according to the anode coagulant dip process, or, a form having deposited thereon the dip-formable composition can be dipped in a bath of coagulant according to the Teague coagulant dip process. Among others, the anode coagulant dip process is preferable because a dip-formed article having a uniform thickness can be obtained.

The coagulant includes, for example, water-soluble multivalent metal salts. As specific examples of the water-soluble multivalent metal salts, there can be mentioned halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Of these, calcium salts are preferable. Calcium nitrate is most preferable. These water-soluble multivalent metal salts are preferably used in an aqueous solution form. The aqueous solution may additionally contain a water-soluble organic solvent such as methyl alcohol and ethyl alcohol. The concentration of a multivalent metal salt in the aqueous solution varies depending upon the particular kind of multivalent metal salt, but is preferably in the range of 5% to 70% by weight and more preferably 20% to 50% by weight.

In the dip-forming method, a form taken from a bath of the dip-formable composition can be treated with warm water or subjected to heat treatment. By the warm water treatment or the heat treatment, excessive monomers and ingredients are removed and a crosslinking reaction of the conjugated diene copolymer is accelerated. The process of warm water treatment or heat treatment is not particularly limited, and includes, for example, a process of dipping the form having the dip-formable composition deposited thereon into warm water, a process of drying the form having the dip-formable composition deposited thereon by warm air in an oven, and a process of irradiating the form having the dip-formable composition deposited thereon with infrared rays. The heating temperature is preferably in the range of 80 to 150° C. and more preferably 100 to 130° C., and the heating time is in the range of about 10 to 120 minutes.

Before or after the form having the dip-formable composition deposited thereon is subjected to warm water treatment or heat treatment, the form is preferably washed with water or warm water to remove water-soluble impurities such as excessive emulsifier and coagulant.

The dip-formed article is finally removed from the form. As the removing process, a process of manually removal or a process of removal by water pressure or compressed air pressure is adopted. Even when the step of forming the dip-formed article has not been completed, the dip-formed article can be removed from the form in the midway of the step and thereafter subjected to the remainder treatment.

In the case where the dip-formed article is a glove, fine organic or inorganic particles such as talc, calcium carbonate or starch can be sprayed on the surfaces of glove, or an elastomer layer containing these fine organic or inorganic particles can be formed on the surfaces of glove, or, the surfaces of glove can be chlorinated, so that the glove can be easily donned and put off, or the glove does not stick to each other when the glove is placed in contact with each other.

The dip-formed article of the present invention is made from the above-mentioned dip-formable composition, and has a modulus in tension at 300% elongation of not larger than 3 MPa, a tensile strength at break of at least 10 MPa, an elongation at break of at least 500% and a modulus retention of at least 50%.

The modulus in tension at 300% elongation of the dip-formed article is not larger than 3 MPa and preferably not larger than 2.5 MPa. If the 300% modulus is larger than 3 MPa, the followability of glove becomes poor.

The tensile strength at break of the dip-formed article is at least 10 MPa, preferably at least 12 MPa and more preferably at least 14 MPa. If the tensile strength is lower than 10 MPa, a glove tends to be easily broken upon donning.

The elongation at break of the dip-formed article is at least 500% and preferably at least 550%. If the elongation is smaller than 500%, a glove is poor in donning.

The modulus retention of the dip-formed article is at least 50% and preferably at least 60%. If the modulus retention is smaller than 50%, the lastingness of tight conformity of glove becomes poor. The modulus retention is a measure for the difficulty in occurrence of stress relaxation, and is determined as follows. A specimen punched from a dip-formed article is drawn to an elongation of 100% (namely to a length of twice of the original length), and immediately thereafter modulus in tension (A) is measured. After the specimen is retained for 6 minutes, its modulus in tension (B) is measured. The modulus retention is expressed by the ratio (B)/(A).

The dip-formed article of the present invention preferably has a network chain concentration in the range of $4 \times 10^{-4}$ to $7 \times 10^{-4}$ mol/cm$^3$, more preferably $4.5 \times 10^{-4}$ to $6.5 \times 10^{-4}$ mol/cm$^3$ and especially preferably $4.8 \times 10^{-4}$ to $6 \times 10^{-4}$ mol/cm$^3$. When the network chain concentration is within this range, a glove is not easily broken, can easily be donned and put off, and has good followability and good lastingness of the tight conformity to the skin of a wearer's hand.

The network chain concentration is determined by a method, explained in detail below, wherein a dip-formed article is dipped in toluene and, when the equilibrium swelling is reached, volume of the swollen specimen is measured, and the network chain concentration is calculated from the volume of the swollen specimen and the original volume of the specimen as measured before the dipping in toluene.

The dip-formed article of the present invention has a thickness in the range of about 0.05 mm to about 3 mm, and is especially suitable for thin-gage filmy articles having a thickness of about 0.1 mm to about 0.3 mm. As specific examples of the dip-formed article, there can be mentioned a nipple of nursing bottle, medical articles such as a dropper, a tube and a water-pillow: toys and sporting goods such as a balloon, a doll and a ball; industrial articles such as a pressure bag and a gas storage bag; a surgical glove, a household glove, an agricultural glove, a fishery glove and an industrial glove; and a finger cot. The dip-formed article is especially suitable for thin-gage surgical gloves and thin-gage gloves for electronic parts-production.

The invention will now be described specifically by the following working examples that by no means limit the scope of the invention. In the working examples, % and parts are by weight unless otherwise specified.

The physical properties evaluated in the working examples are determined by the following methods.

[Analysis of Composition of Copolymer]

A sample was taken from an as-produced copolymer latex, and residual unreacted monomers were removed therefrom. Then the sample was coagulated and then dried according to JIS K 6392 to give a solid rubber. A bound acrylonitrile content was measured on the solid rubber sample.

About 0.2 g of the above-mentioned solid rubber sample was precisely weighed and dissolved in 100 ml of pyridine. The rubber sample solution was titrated with an 0.02N alcoholic potassium hydroxide solution in a nitrogen atmosphere by using a thymolphthalein indicator to neutralize the carboxyl groups in the copolymer. Thus, bound methacrylic acid content was determined from the amount of potassium hydroxide required for neutralization of the carboxyl groups in the copolymer.

Bound 1,3-butadiene content in the solid rubber was determined as the rest of sample, obtained by subtracting the sum of bound acrylonitrile content and bound methacrylic acid content from the weight of sample.

[pH Value]

pH value of a copolymer latex was measured at a temperature of 25° C. and a solid concentration of 45% by using a pH meter (M12, available from HORIBA Co.).

[Weight Average Molecular Weight]

A copolymer latex having a solid concentration of 45% and pH of 8.3 was prepared. The copolymer latex was cast on a glass sheet with a frame, and left to stand at a temperature of 23° C. and a relative humidity of 50% for 48 hours to give a dry film. The dry film was dissolved in tetrahydrofuran (THF). Using the solution, weight average molecular weight of the copolymer was determined by gel permeation chromatography (eluting solution: THF) using a calibration curve prepared on the basis of standard polystyrene.

[Insolubles in Methyl Ethyl Ketone]

0.3 g of the above-mentioned dry film was placed in a cage of wire mesh with 80 mesh, and dipped in 100 ml of methyl ethyl ketone at a temperature of 20° C. for 48 hours. The solid remaining undissolved in the cage was dried under a reduced pressure at a temperature of 100° C. The dried solid was weighed to determine the content of insolubles in methyl ethyl ketone.

[Network Chain Concentration]

Network chain concentration of a dip-formed article was determined by the method described in Rubber Testing Method, New Edition, Corporated Body "The Society of Rubber Industry, Japan" published Nov. 1, 1980, p211. This method will be described in detail below.

A circular test sample having a diameter of 2 cm (D1) was punched from a dip-formed article having a glove shape with a thickness of 0.1 to 0.13 mm. The test sample was thoroughly dipped in a large amount of toluene, and left to stand at a temperature of 20° C. for 72 hours. After the dipped sample came to the equilibrium swelling, the diameter (D2) of the swollen sample was measured. Volume fraction (Vr) of rubber ingredient in the swollen sample was calculated from the following formula (1):

$$Vr = (D1/D2)^3 \tag{1}$$

Then the swollen sample was dried, and volume (g2) of the dried sample was measured. Volume fraction (g) of rubber ingredient in the sample before dipping in toluene was calculated from the ratio (g2/g1) wherein g1 is volume of the sample as measured before immersion in toluene.

Network chain concentration (τ) of the sample before dipping in toluene was calculated from the following formula (2):

$$\tau = -g[\ln(1-Vr) + Vr + \mu Vr^2]/V(g^{2/3}Vr^{1/3} - Vr/2) \tag{2}$$

where V: molar volume of toluene

μ: solvent-polymer interaction constant=106.24 cm$^3$/mol

The solvent-polymer interaction constant μ was calculated from the following formula (3) according to Polymer Handbook Fourth Edition, VII/679.

$$\mu = V([Sp]_1 - [Sp]_2)^2/RT \tag{3}$$

where $[Sp]_1$: solubility parameter of toluene=9.1 (cal/cm$^3$)$^{1/2}$ $[Sp]_2$: solubility parameter of rubber ingredient [(cal/cm$^3$)$^{1/2}$]

R: gas constant [(cal/K·mol)]

T: absolute temperature (K)

The solubility parameter ($[SP]_2$) of rubber ingredient was calculated from the following formulae (4) and (5) according to the Fedors' method (Robert F. Fedors, Polym. Eng. Sci., 14 [2] 147 (1974).

$$Spi = (\Sigma\Delta ej/\Sigma\Delta vj)^{1/2} \tag{4}$$

$$[Sp]_2 = \Sigma Xi \times Spi \tag{5}$$

where Spi: solubility parameter of monomer unit "i" [(cal/cm$^3$)$^{1/2}$]

Δej; evaporation energy (cal/mol) of atom (j) or atomic group (j) constituting monomer unit "i"

Δvj: mol volume (cm$^3$/mol) of atom (j) or atomic group (j) constituting monomer unit "i"

Xi: Mol fraction of monomer unit "i" in rubber ingredient

[Preparation of Test Sample for Evaluation of Physical Properties of Dip-Formed Article]

A test sample with a thickness of 0.1 to 0.13 mm was punched from a glove-shaped dip-formed article by using a Die-c to a dumbbell shape according to ASTM-D412.

[Modulus in Tension at 300% Elongation; 300% Modulus]

Modus in tension at 300% elongation was measured by using tensilometer ("RTC-1225" available from Orientec K. K.) at a drawing rate of 500 mm/min.

[Tensile Strength]

Tensile strength at break was measured by using a tensilometer immediately before a test sample was broken when it was drawn at a drawing rate of 500 mm/min.

[Elongation at Break]

Elongation at break was measured by using a tensilometer immediately before a test sample was broken when it was drawn at a drawing rate of 500 mm/min.

[Modulus Retention]

Modulus in tension was measured immediately after a test sample was drawn to an elongation of 100% and after the drawn sample was retained for 6 minutes. After the specimen was retained for 6 minutes, its modulus in tension (B) was measured. The modulus retention was expressed by the ratio (B)/(A) of the modulus in tention (B) as measured after 6 minutes' retention to the modulus in tention (A) as measured at 100% elongation.

[Physical Properties of Glove]

Ease in donning and putting off (ease in donning), weariness of a wearer's hand when a glove is worn for a long time (i.e., followability), and lastingness of tight conformity to the skin of a wearer's hand (i.e., lastingness of tight conformity) were evaluated on dip-formed gloves according to a sensory analysis by ten wearers. The results were expressed by the average value of evaluation points of the ten wearers determined according to a five point rating method. The larger the average value, the better the particular property. Breaking of glove was expressed by the number of wearers among ten wearers, who broke a glove upon donning.

PRODUCTION EXAMPLE 1

A polymerization vessel, flushed with nitrogen, was charged with 22 parts of acrylonitrile, 75 parts of 1,3-butadiene, 3 parts of methacrylic acid, 0.6 part of t-dodecyl mercaptan (TDM), 115.5 parts of soft water, 3.0 parts of sodium dodecylbenzenesulfonate, 0.5 part of a sodium salt of β-naphthalenesulfonic acid-formaldehyde condensate, 0.3 part of potassium persulfate and 0.05 part of ethylonediaminetetraacetic acid, and the content was maintained at 37° C. to initiate polymerization. After the reaction was carried out for 20 hours, a reaction stopper was added to complete the polymerization. At this time, the polymerization conversion was 92%. A portion of the thus-obtained copolymer latex was taken to analyze the composition of copolymer. The results of analysis are shown in Table 1.

Unreacted monomers were removed from the copolymer latex, and pH and solid content of the copolymer latex were adjusted to give a copolymer latex "A" having a solid concentration of 45% and a pH value of 8.3.

PRODUCTION EXAMPLES 2 to 6

The procedures described in Production Example 1 were repeated wherein the composition of monomers was varied as shown in Table 1 to give copolymer latexes "B" through "F", all of which had a solid concentration of 45% and a pH value of 8.3.

TABLE 1

| | Production Example | | | | | |
|---|---|---|---|---|---|---|
| | 1 | 2 | 3 | 4 | 5 | 6 |
| Monomers (parts) | | | | | | |
| Acrylonitrile | 22 | 27 | 32 | 42 | 27 | 22 |
| 1,3-Butadiene | 75 | 71 | 66 | 54 | 67.5 | 77.9 |
| Methacrylic acid | 3 | 2 | 2 | 4 | 5.5 | 0.1 |
| Copolymer composition (%) | | | | | | |
| Acrylonitrile | 23 | 27.5 | 33 | 41 | 28 | 23 |
| 1,3-Butadiene | 74 | 70 | 65 | 55 | 66.5 | 76.9 |
| Methacrylic acid | 3 | 2.5 | 2 | 4 | 5.5 | 0.1 |
| Copolymer latex | A | B | C | D | E | F |
| Weight average molecular weight (×1000) | 143 | 123 | 139 | 205 | 141 | 137 |
| Insolubles in MEK (%) | 3 | 2.5 | 1.3 | 2.2 | 1.9 | 2 |

EXAMPLE 1

3 parts of sulfur, 1.5 parts of titanium oxide, 1.5 parts of zinc diethyldithiocarbamate, 1.5 parts of zinc 2-mercaptpbenzothiazole, 0.3 part of a 45% solution of sodium salt of β-naphthalenesulfonic acid-formaldehyde condensate, 0.002 part of potassium hydroxide and 7.472 parts of water were mixed together by using a ball mill to prepare a vulcanizer dispersion having a solid content of 50%. Solid content and pH of copolymer latex A prepared in Production Example 1 were adjusted to prepare a copolymer latex having a solid concentration of 30% and a pH value of 10. 333.3 parts of this copolymer latex was mixed with 15 parts of the above-mentioned vulcanizer dispersion to prepare a dip-formable composition.

25 parts of calcium nitrate, 5 parts of calcium carbonate, 0.025 part of polyoxyethylene octyl phenyl ether and 70 parts of water were mixed together to prepare a coagulating solution having solid content of 30%. A glove form was dipped in the coagulating solution, taken out therefrom and dried to deposit a coagulant on the glove form.

The coagulant-deposited glove form was dipped in the above-mentioned dip-formable composition, and then taken out therefrom. The thus-obtained glove form coated with the dip-formable composition was dried by a dryer. Then the temperature was elevated to 120° C. and the dried glove form was heat-treated at that temperature for 20 minutes to give a glove form having a solid rubber film on the outer periphery. Then the solid rubber film was stripped from the glove form to give a dip-formed article with glove shape. The physical properties of the glove were evaluated. The results are shown in Table 2.

TABLE 2

|  | Example | | | Comparative Example | | |
|---|---|---|---|---|---|---|
|  | 1 | 2 | 3 | 1 | 2 | 3 |
| Dip-formable composition (parts) | | | | | | |
| Copolymer latex | A | B | C | D | E | F |
| Amount of latex | 100 | 100 | 100 | 100 | 100 | 100 |
| Amt. of sulfur | 3 | 3 | 3 | 3 | 3 | 3 |
| Ant. of zinc oxide | 0 | 0 | 0 | 0 | 0 | 0 |
| Net-work chain concentration ($\times 10^{-4}$ mol/cm$^3$) | 5.1 | 4.5 | 5.3 | 9.6 | 7.3 | 2.9 |
| Properties of dip-formed article | | | | | | |
| 300% Modulus (MBa) | 1.9 | 1.7 | 2.2 | 9.1 | 3.7 | 0.71 |
| Tensile strength (MPa) | 17.5 | 17.8 | 18.5 | 37.9 | 27.6 | 1.5 |
| Breaking elongation (%) | 620 | 650 | 620 | 470 | 500 | 520 |
| Modulus retention (%) | 63 | 66 | 70 | 42 | 46 | 77 |
| Properties of glove (points) | | | | | | |
| Non-weariness of hand | 4.6 | 4.4 | 4 | 1 | 1.8 | 5 |
| Breaking of glove | 0 | 0 | 0 | 0 | 0 | 10 |
| Ease in donning | 4.4 | 4.9 | 4.5 | 2.7 | 3.5 | 3.5 |
| Tight conformity | 4.2 | 4.4 | 4.6 | 2.6 | 2.8 | 5 |

EXAMPLES 2 TO 5, COMPARATIVE EXAMPLE 1 TO 6

By the same procedures as described in Example 1, dip-formed gloves were made wherein the kind of copolymer latex, and amounts of sulfur and zinc acetate were varied as shown in Table 2 and Table 3.

TABLE 3

|  | Example | | Comparative Examples | | |
|---|---|---|---|---|---|
|  | 4 | 5 | 4 | 5 | 6 |
| Dip-formable composition (parts) | | | | | |
| Copolymer latex | A | A | A | A | A |
| Amount of latex | 100 | 100 | 100 | 100 | 100 |
| Amt. of sulfur | 2.5 | 4 | 7 | 1 | 4 |
| Amt. of zinc oxide | 0 | 0.1 | 0 | 0 | 0.3 |
| Network chain concentration ($\times 10^{-4}$ mol/cm$^3$) | 5.2 | 6.4 | 8.2 | 3.5 | 7.8 |
| Properties of dip-formed article | | | | | |
| 300% Modulus (MPa) | 1.8 | 2.4 | 5.6 | 1.2 | 3.2 |
| Tensile strength (MPa) | 14.1 | 15.2 | 16.1 | 6.5 | 8.9 |
| Breaking elongation (%) | 600 | 550 | 400 | 650 | 420 |
| Modulus retention (%) | 60 | 68 | 81 | 45 | 71 |
| Properties of glove (points) | | | | | |
| Non-weariness of hand | 4.4 | 3.9 | 1.6 | 4.8 | 2.5 |
| Breaking of glove | 0 | 0 | 0 | 4 | 2 |
| Ease in donning | 4.2 | 4 | 2 | 5 | 2.3 |
| Tight conformity | 4 | 4.5 | 5 | 2.8 | 4.6 |

From comparison of gloves of the present invention with those of comparative examples, shown in Table 2 and Table 3, it will be seen that the gloves of comparative examples are characterized as follows.

The glove, made in Comparative Example 1, having large 300% modulus, small breaking elongation and small modulus retention has poor ease in donning, poor non-weariness of hand, and poor lastingness of tight conformity.

The glove, made in Comparative Example 2, having large 300% modulus and small modulus retention has poor ease in donning, poor non-weariness of hand, and poor lastingness of tight conformity.

The glove, made in Comparative Example 3, having extremely low tensile strength is easily broken upon donning.

The glove, made in Comparative Example 4, having large 300% modulus and small breaking elongation has poor ease in donning and poor non-weariness of hand.

The glove, made in Comparative Example 5, having low tensile strength and small modulus retention is easily broken upon donning and poor lastingness of tight conformity.

The glove, made in Comparative Example 6, having large 300% modulus, low tensile strength and small breaking elongation is easily broken upon donning and has poor ease in donning and poor non-weariness of hand.

In contrast, the gloves, made in Examples 1 to 5, having the characteristics satisfying the requirements of the present invention are not easily broken upon donning, and has enhanced ease in donning, good non-weariness of hand, and good lastingness of tight conformity.

INDUSTRIAL APPLICABILITY

The dip-formed article of the present invention, made from a dip-formable composition comprising the specific conjugated diene copolymer and sulfur, and having the specified properties, is characterized as a glove by being well elongated and ease in donning, being not easily broken upon donning, and not wearying a wearer's hand even when it is worn for a long time, and having improved lastingness of the tight conformity to the skin of a wearer's hand.

What is claimed is:

1. A dip-formed article which is shaped from a dip-formable composition comprising a conjugated diene copolymer comprising 60% to 81% by weight of conjugated diene monomer units, 17% to 35% by weight of ethylenically unsaturated nitrile monomer units, 2% to 3.5% by weight of ethylenically unsaturated acid monomer units, and 0% to 21% by weight of copolymerizable other ethylenically unsaturated monomer units, and sulfur; and which has a modulus in tension at 300% elongation of not larger than 3 MPa, a tensile strength at break of at least 10 MPa, an elongation at break of at least 500% and a modulus retention of at least 50%, and has a network chain concentration in the range of $4.8 \times 10^{-4}$ to $6 \times 10^{-4}$ mol/cm$^3$.

2. The dip-formed article according to claim 1, which is a medical article, a toy, a sports good, an industrial article or a glove.

3. The dip-formed article according to claim 1, which is a thin-wall glove.

4. A dip-formable composition comprising 100 parts by weight of a conjugated diene copolymer comprising 60% to 81% by weight of conjugated diene monomer units, 17% to 35% by weight of ethylenically unsaturated nitrile monomer units, 2% to 3.5% by weight of ethylenically unsaturated acid monomer units and 0% to 21% by weight of copolymerizable other ethylenically unsaturated monomer units and 2 to 6 parts by weight of sulfur and does not contain zinc oxide, wherein said conjugated diene copolymer has been prepared by emulsion polymerization and contains not larger than 50% by weight of ingredients insoluble in methyl ethyl ketone.

5. The dip-formable composition according to claim 4, which further comprises 0.5 to 4 parts by weight of a vulcanization accelerator, based on 100 parts by weight of the conjugated diene copolymer.

6. The dip-formable composition according to claim 4, wherein said conjugated diene copolymer has a weight average molecular weight in the range of 50,000 to 500,000.

7. A method for making a dip-formed article comprising dip-forming a dip-formable composition as claimed in claim 4.

8. The dip-formable composition according to claim 4, wherein latex of said conjugated diene copolymer prepared by emulsion polymerization has a number average particle diameter in the range of 60 to 300 nm.

9. A dip-formed article according to claim 1, wherein said conjugated diene copolymer comprises 65% to 76% by weight of conjugated diene monomer units, 22% to 32% by weight of ethylenically unsaturated nitrile monomer units, 2% to 3% by weight of ethylenically unsaturated acid monomer units, and 0% to 11% by weight of copolymerizable other ethylenically unsaturated monomer units.

10. A dip-formed article according to claim 1, wherein said conjugated diene copolymer is a butadiene-acrylonitrile-methacrylic acid copolymer.

11. A dip-formed article according to claim 1, wherein said conjugated diene copolymer comprises 61.5% to 81% by weight of butadiene units, 17% to 35% by weight of acrylonitrile units, and 2% to 3.5% by weight of methacrylic acid units.

12. A dip-formed article according to claim 1, wherein said conjugated diene copolymer comprises 65% to 76% by weight of butadiene units, 22% to 32% by weight of acrylonitrile units, and 2% to 3% by weight of methacrylic acid units.

13. A dip-formed article according to claim 1, wherein said conjugated diene copolymer contains not larger than 50% by weight of ingredients insoluble in methyl ethyl ketone.

14. A dip-formed article according to claim 1, wherein said conjugated diene copolymer has a weight average molecular weight in the range of 50,000 to 500,000.

15. A dip-formed article according to claim 1, wherein the dip-formable composition contains 2 to 6 parts by weight of sulfur, based on 100 parts by weight of the conjugated diene copolymer.

16. A dip-formed article according to claim 1, wherein the dip-formable composition further comprises 0.5 to 4parts by weight of a vulcanization accelerator, based on 100 parts by weight of the conjugated diene copolymer.

17. A dip-formed article according to claim 1, wherein the dip-formable composition does not contain zinc oxide.

18. A dip-formable composition according to claim 4, wherein said conjugated diene copolymer comprises 61.5% to 81% by weight of butadiene units, 17% to 35% by weight of acrylonitrile units, and 2% to 3.5% by weight of methacrylic acid units.

19. A dip-formable composition according to claim 4, (wherein said conjugated diene copolymer comprises 65% to 76% by weight of butadiene units, 22% to 32% by weight of acrylonitrile units, and 2% to 3% by weight of methacrylic acid units.

* * * * *